(12) United States Patent
Villemaire et al.

(10) Patent No.: US 6,758,605 B1
(45) Date of Patent: Jul. 6, 2004

(54) CLEANING DEVICE AND METHOD FOR OPTICAL CONNECTORS

(75) Inventors: André Villemaire, Ste-Foy (CA); Louis Brault, St-Augustin de Desmaures (CA); Jean Giroux, Saint-Augustin (CA)

(73) Assignee: Telops Inc., Saint-Augustin (CA)

( * ) Notice: Subject to any disclaimer, the term of this patent is extended or adjusted under 35 U.S.C. 154(b) by 26 days.

(21) Appl. No.: 10/370,094

(22) Filed: Feb. 21, 2003

(51) Int. Cl.[7] .......................... G02B 6/36; B43L 21/00
(52) U.S. Cl. ........................................ 385/85; 15/210.1
(58) Field of Search ............................ 385/85, 75, 92, 385/70; 15/210.1

(56) References Cited

U.S. PATENT DOCUMENTS

| | | |
|---|---|---|
| 5,117,528 A | 6/1992 | Kanayama et al. |
| 5,220,703 A | 6/1993 | Kanayama et al. |
| 5,325,452 A | 6/1994 | Stein et al. |
| 5,768,738 A | 6/1998 | Lee |
| 5,906,686 A | 5/1999 | McNeil |
| 5,956,793 A | 9/1999 | Cox |
| 6,053,985 A | 4/2000 | Cheswick et al. |
| 6,056,548 A | 5/2000 | Neuberger et al. |
| 6,094,767 A | 8/2000 | Iimura |
| 6,209,163 B1 | 4/2001 | Clairadin et al. |
| 6,239,442 B1 | 5/2001 | Iimura |
| 6,449,795 B1 * | 9/2002 | Sato ........................... 15/210.1 |
| 6,467,980 B1 * | 10/2002 | Krause ........................ 401/198 |
| 6,560,811 B1 * | 5/2003 | Krause et al. ............. 15/210.1 |
| 6,619,854 B2 * | 9/2003 | Kiani ........................... 385/75 |
| 6,629,329 B1 * | 10/2003 | Webb et al. ............... 15/209.1 |

FOREIGN PATENT DOCUMENTS

| | | |
|---|---|---|
| JP | 8-101325 | 4/1996 |
| JP | 9-197182 | 7/1997 |
| JP | 9-285768 | 11/1997 |
| JP | 3-191901 | 7/2001 |
| JP | 2002-090576 | 3/2002 |
| WO | WO 01/53867 | 7/2001 |

OTHER PUBLICATIONS

Dr. Gerald Farrell, "Cleaning and inspecting Optical Fibre Connectors", PXIT PX Instrument Technology, Sensible Solutions.

* cited by examiner

*Primary Examiner*—Chandrika Prasad
(74) *Attorney, Agent, or Firm*—Ogilvy Renault; Isabelle Chabot

(57) ABSTRACT

A method and device for cleaning at least an end face of an optical device retained within an optical connector using a cleaning fabric, comprises, alone or in combination, a) preventing the cleaning fabric from contacting the connector prior to contacting the end face of the optical device; b) a cleaning nose being made of a nose material having a hardness less than that of a material of the optical device with a flexural modulus greater than 2700 MPa and c) ensuring a constant tension on the fabric as it is circulated.

33 Claims, 6 Drawing Sheets

CLEANING DEVICE AND METHOD FOR OPTICAL CONNECTORS

FIELD OF THE INVENTION

The invention relates to cleaning devices intended for optical connectors, and more particularly cleaning devices for the removal of contaminants and small particles from optical fiber and ferrule end faces.

BACKGROUND OF THE INVENTION

Today, optical fiber transmission cables are used for many high rate communication applications. The advantages of using light guiding cables over electrical wires are obvious in terms of frequency bandwidth and data rate. Similarly to standard communication systems, optical fiber networks require amplifying stations for signal boosting over large distances switching, multiplexing, demultiplexing and terminals for fiber test instrumentation and measurements. This implies a lot of optical connectors to be used for connecting the different cables to the communication network.

Optical connectors are opto-mechanical components that allow the light to travel from one fiber to another. Different connector types have been designed for a plurality of applications. For example, FC/PC, ST and SC connector types are used for distinct applications. FC/PC connectors are used for high-end single mode fiber telecommunications systems and ST connectors are for multi-mode fiber applications, such as LAN cabling systems.

The connectors are mechanical male and female plugs composed of ferrules in which the optical fibers are inserted. The plugs are joined together to align the fibers end to end in physical contact in a precise manner. The fiber and ferrule ends are polished to optimize the light transmission. This is to avoid light intensity attenuation at the connector intersection, which would affect the total loss of the signal. Light emitting diodes (LED's) and other optical devices can also be used with some connectors for connection to other devices.

Ferrules are typically made of Zirconia, stainless steel or polyphenylene sulfide.

In practice, the efficiency of the light transmission between the fibers may be affected by dust, dirt and other contaminants. They can interfere with the light signal by producing scattering and absorption sites that may reduce significantly the light transmission. This may also lead to physical damage of the fiber ends and may require the replacement of the connector. Another potential hazard is abrasive contaminant particles that may damage the fiber end surface, especially if the ferrules are rotated against each other during the initial mating.

In order to avoid transmission problems and keep the ferrules and fiber ends in good conditions, connector cleaning must be done frequently. Several methods are used to clean the optical fiber end surfaces before mating connectors.

The first method involves the use of compressed air sprayed across the ferrule to remove contaminants from the fiber surface. The drawback of this method is that the force applied is not always sufficient to be effective. Moreover, the compressed air itself may also contaminate the surface with small particles.

Other methods use wet and/or dry cleaning. Wet cleaning utilizes isopropyl alcohol and lint-free cloths for wiping across the ferrule end face to remove the contaminants. The problem is that lint-free cloth can still leave contaminant materials on the surface. The wiping action may also scratch the surface if abrasive contaminants are present.

The dry cleaning approach involves a special textile cleaning tape or film on a reel inside a cartridge. The cartridge stores the tape reel and provides a window onto a short portion of the cloth tape for cleaning the ferrule ends of connectors. Like the wet cleaning approach, contaminants may still stay on the surface. The sliding and wiping action of the film with abrasive particles may damage the surface, depending on the manual pressure applied. The cleaning quality is also very dependent on the operator skill.

Other methods use cleaners having a housing with a nose that can be mated to an optical connector. A cleaning tape, such as a tape fabricated of a woven fabric, cleans the ferrule and the optical fiber ends. A supply reel is mounted in the housing for supplying the cleaning tape. The whole reel and fabric mechanism is rotated together against the ferrule with a fixed pressure. The disadvantages of such a system are that the device does not allow control of the applied pressure on the ferrule and that the portion of the fabric used is manually controlled. The device cannot automatically manage the fabric length used for the cleaning process. Moreover, the device has a lot of moving mechanical parts, which can be troublesome and could create instabilities and uncertainties during the cleaning process.

An example of a prior art cleaner for the end face of a ferrule of a connector is Japanese published patent application no. 2002-90576. It describes a pin projecting from a rotary part which is rotated in the axial direction. The pin is provided with a groove, along the side face of which a thread for cleaning the ferrule is stretched and wound at a prescribed speed. As a result, by pressing the pin on the ferrule, a new part of the thread constantly comes into contact with the ferrule to enable its tip end face, particularly its center part, to be cleaned. The thread therefore cleans the end face of the ferrule as the pin rotates 360°. The grooves allow the thread to be directed properly and to be in constant contact with the ferrule end face.

Some problems identified with the prior art device of Japanese published patent application no. 2002-90576 are that the thread may become dirty prior to reaching the ferrule as it accumulates contaminants while circulating in the groove. The thread may also become loose as it is circulated in the device. Finally, the pin of the prior art devices may damage the end face of the ferrule as pressure is exerted by the device to activate the cleaning mechanism.

SUMMARY OF THE INVENTION

Accordingly, an object of the present invention is to solve, separately or in combination, the above mentioned problems, namely ensuring the cleanliness of the fabric used to clean the ferrule and protecting the ferrule end face by preventing too much pressure from being applied on the ferrule end face.

A method and device for cleaning at least an end face of an optical device retained within an optical connector using a cleaning fabric, comprises, alone or in combination, a) preventing the cleaning fabric from contacting the connector prior to contacting the end face of the optical device; b) a cleaning nose being made of a nose material having a hardness less than that of a material of the optical device with a flexural modulus greater than 2700 MPa and c) ensuring a constant tension on the fabric as it is circulated.

According to a first broad aspect of the present invention, there is provided a device for cleaning at least an end face of an optical device retained within an optical connector using a cleaning fabric, comprising: a housing having a handle portion, a supply for the cleaning fabric and a forward tip, the forward tip being adapted to mate with the optical connector; a cleaning nose within the forward tip adapted to receive the cleaning fabric and to be at least partially inserted in the optical connector to contact at least the end face of the optical device; circulation means for circulating the cleaning fabric within the housing and on the cleaning nose to expose an unused portion of cleaning fabric on an extremity of the cleaning nose contacting the end face; the cleaning nose having a supply channel and a take-up groove located diametrically opposed on the extremity of the nose, the channel and the groove being adapted to respectively receive a supply of the fabric and a contaminated portion of the fabric, the fabric being contaminated on contact with the end face on the extremity; the supply channel preventing the fabric from being contaminated by the optical connector prior to contacting the end face of the optical device.

According to another aspect of the present invention, there is provided a device for cleaning at least an end face of an optical device retained within an optical connector using a cleaning fabric, comprising: a housing having a handle portion, a supply for the cleaning fabric and a forward tip, the forward tip being adapted to mate with the optical connector; a cleaning nose mounted within the forward tip adapted to receive the cleaning fabric and to be at least partially inserted in the optical connector to contact at least the end face of the optical device; rotation means for rotating the cleaning nose by at least 180° to wipe the cleaning fabric over a whole surface of the end face; wherein the cleaning nose is made of a nose material having a hardness less than that of a material of the optical device with a flexural modulus greater than 2700 MPa and wherein an extremity of the nose is polished to prevent damage to the end face when pressure is applied on the housing towards the connector.

According to another aspect of the present invention, there is provided a device for cleaning at least an end face of an optical device retained within an optical connector using a cleaning fabric, comprising: a housing having a handle portion, a supply for the cleaning fabric and a forward tip, the forward tip being adapted to mate with the optical connector; a cleaning nose within the forward tip adapted to receive the cleaning fabric and to be at least partially inserted in the optical connector to contact at least the end face of the optical device; circulation means for circulating the cleaning fabric within the housing and on the cleaning nose to expose an unused portion of cleaning fabric on an extremity of the cleaning nose contacting the end face; the cleaning nose having a supply groove and a take-up groove located along the nose, the supply and take-up grooves being adapted to respectively receive a supply of the fabric and a contaminated portion of the fabric, the fabric being contaminated on contact with at least the end face; a tension assembly having two transverse walls, two balls each partially received in one of the grooves and a gasket surrounding the nose and the balls, wherein the gasket and balls are trapped between the walls; whereby as the fabric is circulated, the balls are rotated and exert a constant pressure on the fabric thereby ensuring a constant tension on the fabric.

According to another aspect of the present invention, there is provided a method for cleaning at least an end face of an optical device retained within an optical connector using a cleaning fabric, comprising: providing a housing having a handle portion, a supply for the cleaning fabric and a forward tip, the forward tip being adapted to mate with the optical connector; receiving the cleaning fabric at a cleaning nose within the forward tip; partially inserting the cleaning nose in the optical connector to contact at least the end face of the optical device; circulating the cleaning fabric within the housing and on the cleaning nose to expose an unused portion of cleaning fabric on an extremity of the cleaning nose contacting the end face; preventing the cleaning fabric from contacting the connector prior to contacting the end face of the optical device.

According to another aspect of the present invention, there is provided a method for cleaning at least an end face of an optical device retained within an optical connector using a cleaning fabric, comprising: providing a housing having a handle portion, a supply for the cleaning fabric and a forward tip, the forward tip being adapted to mate with the optical connector; providing a cleaning nose within the forward tip for receiving the cleaning fabric, the cleaning nose being made of a nose material having a hardness less than that of a material of the optical device with a flexural modulus greater than 2700 MPa and wherein an extremity of the nose is polished to prevent damage to the end face when pressure is applied on the housing towards the connector, partially inserting the cleaning nose in the optical connector to contact at least the end face of the optical device; rotating the cleaning nose by at least 180° to wipe the cleaning fabric over a whole surface of the end face.

According to another aspect of the present invention, there is provided a method for deaning at least an end face of an optical device retained within an optical connector using a cleaning fabric, comprising: providing a housing having a handle portion, a supply for the cleaning fabric and a forward tip, the forward tip being adapted to mate with the optical connector; providing a cleaning nose having a supply groove and a take-up groove located along the nose, the supply and take-up grooves being adapted to respectively receive a supply of the fabric and a contaminated portion of the fabric, the fabric being contaminated on contact with at least the end face; inserting the cleaning nose in the optical connector to contact at least the end face of the optical device; circulating the cleaning fabric within the housing and on the cleaning nose to expose an unused portion of cleaning fabric on an extremity of the cleaning nose contacting the end face; ensuring a constant tension on the fabric as it is circulated.

BRIEF DESCRIPTION OF THE DRAWINGS

These and other features, aspects and advantages of the present invention will become better understood with regard to the following description and accompanying drawings wherein:

FIG. 5 is a detail of the mating nose and fabric guide assembly mated to the connector and adaptor of FIG. 4a;

FIG. 6 is a cross-sectional view of the mating nose of the cleaning tool assembly of FIG. 4a; and FIG. 7 is a cross-sectional view of the tension assembly of FIG. 4a.

DETAILED DESCRIPTION OF THE PREFERRED EMBODIMENT

Referring to the drawings in detail, the cleaning tool for providing the cleaning of optical device and fernule end surfaces will be described in FIG. 1 to FIG. 7.

Figure 1:
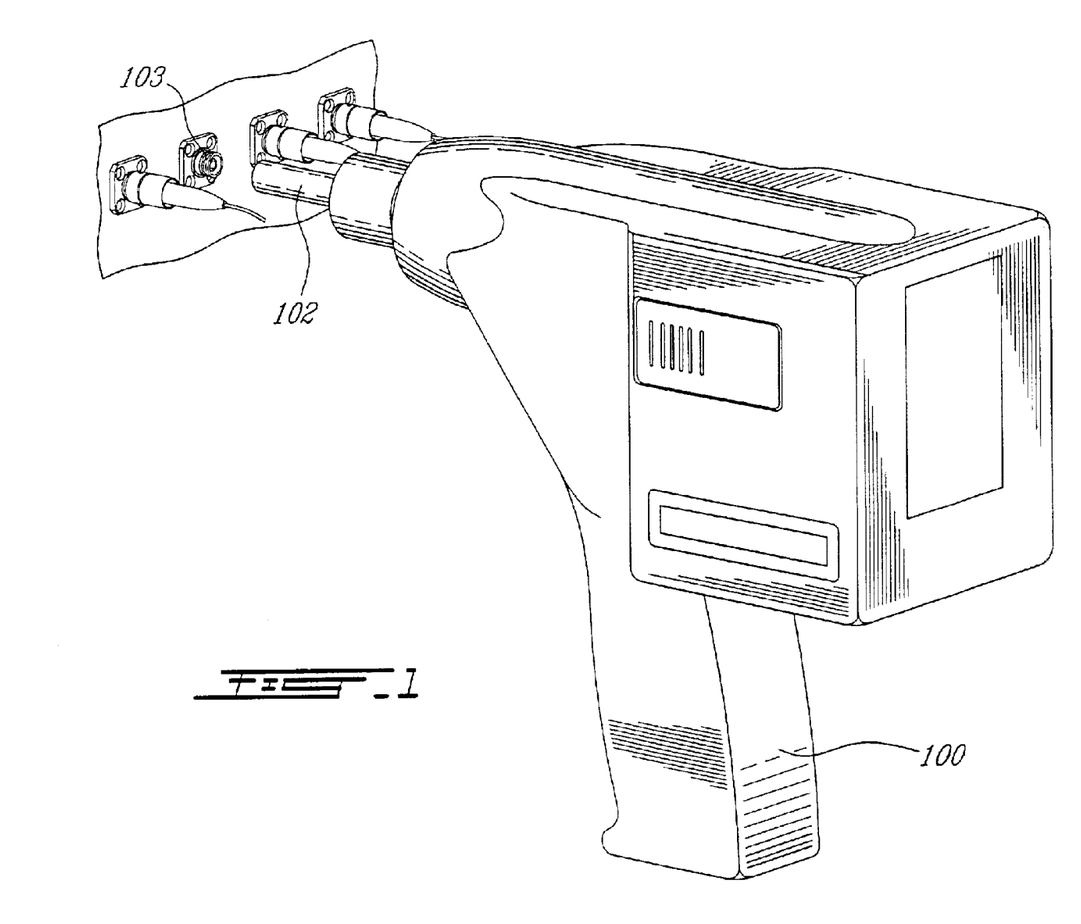
FIG. 1 is a perspective view of a cleaning tool assembly of the present invention.

Shown in FIG. 1 is a perspective view of the cleaning tool assembly 100. The assembly comprises a tool adaptor 102 to be mated with an optical connector assembly 103. The tool adaptor 102 and its mating nose 118 (shown in FIG. 2) can be designed to mate with any type of optical connector assembly including those connector assemblies with an adaptor.

Figure 2:
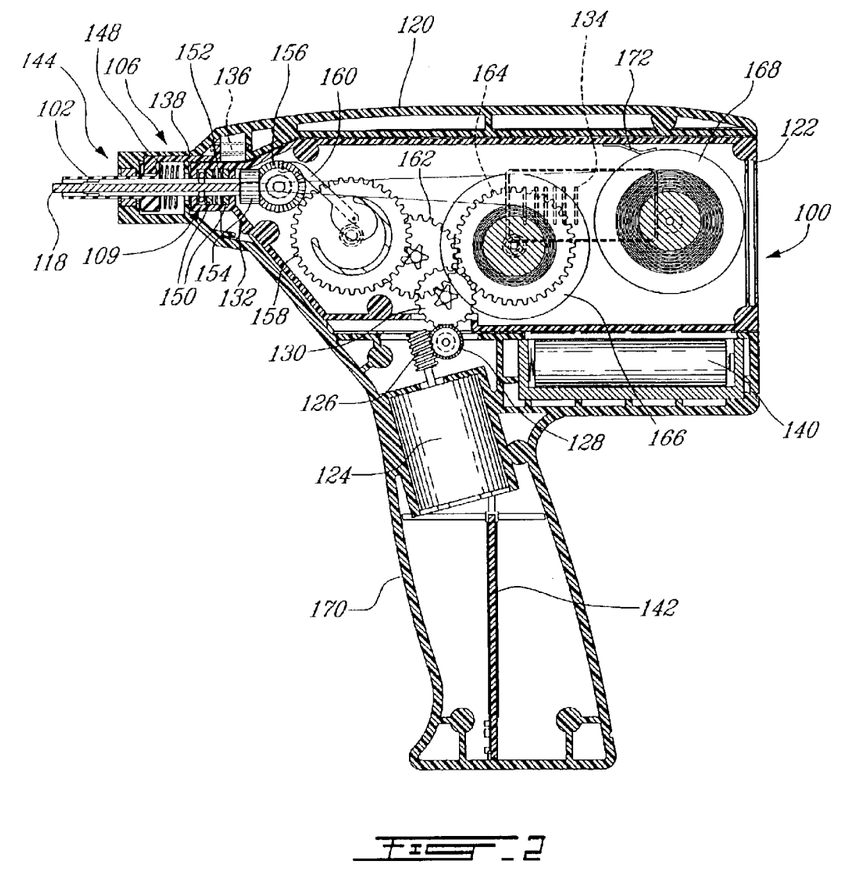
FIG. 2 is a side cross-sectional view of the cleaning tool assembly of FIG. 1.

The overall assembly of the cleaning tool 100 is presented in FIG. 2. The tool casing. 120 has a gun-shape design for a convenient handling by an operator. The replaceable cartridge assembly 122 is easily inserted in the tool casing 120. The tool casing 120 includes a motor 124 with a worm gear 126, which drives the driving gear, 128 to activate the cartridge gear 130. The cartridge assembly 122 is held in place by the holding spring 132 and the snap assembly 134, which is used for the precise positioning of the cartridge against the driving gear 128. The cleaning device is activated by a start/stop switch assembly, which is composed of a switch 136 and a switch rod 138. When the cleaning device is mated to an optical connector, the pressure of the operator's hand on the tool pushes the tool adaptor 102 away from the connector and produces the back movement of the tool adaptor 102 and the switch rod 138, which starts the electrical motor 124. An electronic circuit 142 powered by batteries 140, preferably two M type DC-batteries, controls the operating functions of the cleaning device 100. The electronic printed circuit board 142 is preferably located in the grip handle section 170 of the tool casing 120. The printed circuit board 142 preferably contains a limit switch, a clock and a relay.

Attached to the cartridge assembly 122 is the fabric guider assembly 144 which tip is to be partially inserted into the optical connector. The fabric guider assembly 144 is composed of a tool adaptor 102, a mating nose 118, a tension assembly 109 that prevents the fabric from exiting the grooves 176 and 178 (see FIG. 6), a pressure mechanism including washers 150 and a pressure control spring 152, which allow to apply a fixed pressure on the optical connector ferrule 114 (see FIG. 4a). The central portion of the fabric guider assembly 144 has a pinion gear 154 that rotates at least 180 degrees under the pressure of the crown gear 156. Preferably, it oscillates from −180 degrees to 180 degrees to cover the whole surface of the ferrule end face.

The crown gear 156 is linked to the lever gear 158 by the wipinpg lever 160. The rotational movement of the lever gear 158 produces the wiping action of the fabric guider assembly 144 against the optical device and the optical connector ferrule. The lever gear 158 is driven by the secondary gear 162. The secondary gear 162 is driven by the cartridge gear 130.

The cartridge gear 130 also drives another take-up gear 164, on which is attached the dirty reel traction gear 166. The dirty cleaning fabric is unwound to the dirty reel traction gear 166 and the supply of clean cleaning fabric is wound up on the clean reel traction gear 168, which is free to rotate. The dirty reel traction gear 166 performs the advance of the cleaning fabric during the cleaning process. Spring means 172 are provided to avoid unwinding of the clean fabric from the clean reel traction gear 168.

A pressure compensator 106 is provided on the cleaning tool assembly and allows to protect the mating nose 118 from breaking the ferrule by retaining the tool adaptor 102 using spring means 148. When the cleaning tool is pushed against a connector, the tool adaptor 102 ensures that the mating nose does not mate with the ferrule with too much pressure.

In FIG. 2, the clean fabric and the dirty fabric are shown has being wounded within the housing of the cleaning tool assembly. It will be readily understood that the dirty fabric could be accumulated outside of the cleaning tool assembly since its contamination is irrelevant.

A dirty reel traction gear 166 could be located on the housing. Similarly, the dirty fabric could simply be exited through a slot on the cartridge 122 for immediate tearing and disposal.

Also shown in FIG. 2 is a motor for circulating the fabric on the fabric guider assembly and rotation means for rotating the mating nose to wipe the ferrule and optical device end faces. It will be readily understood that although preferred, the motor and the rotation means are optional since the circulation could be performed manually by the technician by rotating the take-up reel using any activation means on the housing and, similarly, the rotation of the nose could be done manually by the technician by oscillating or rotating the whole cleaning tool assembly.

Figure 3:
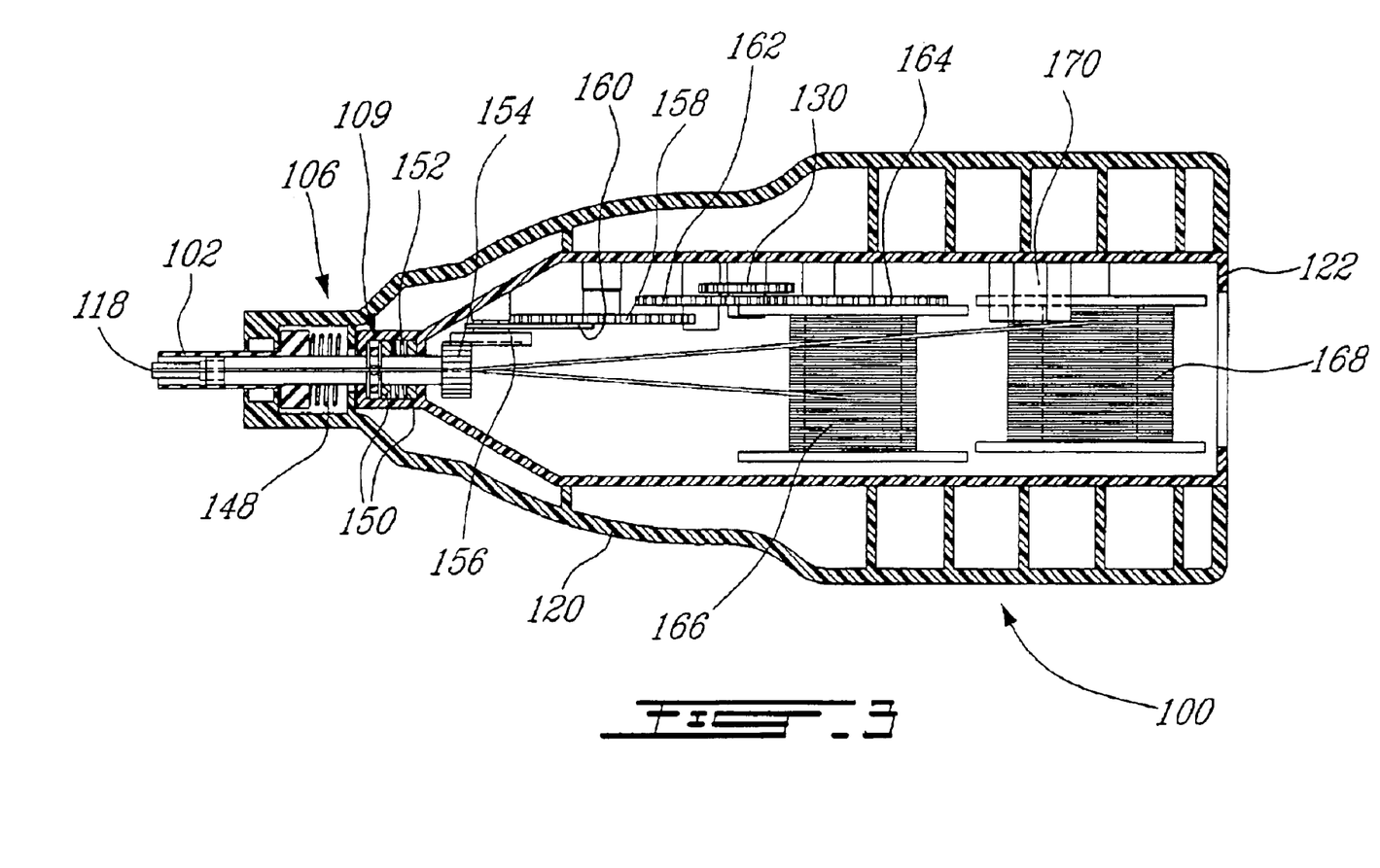
FIG. 3 is a top cross-sectional view of the cleaning tool assembly of FIG. 1.

FIG. 3 is a top view of the cleaning tool assembly 100. Referral is made to the above description of FIG. 2.

Figure 4A:
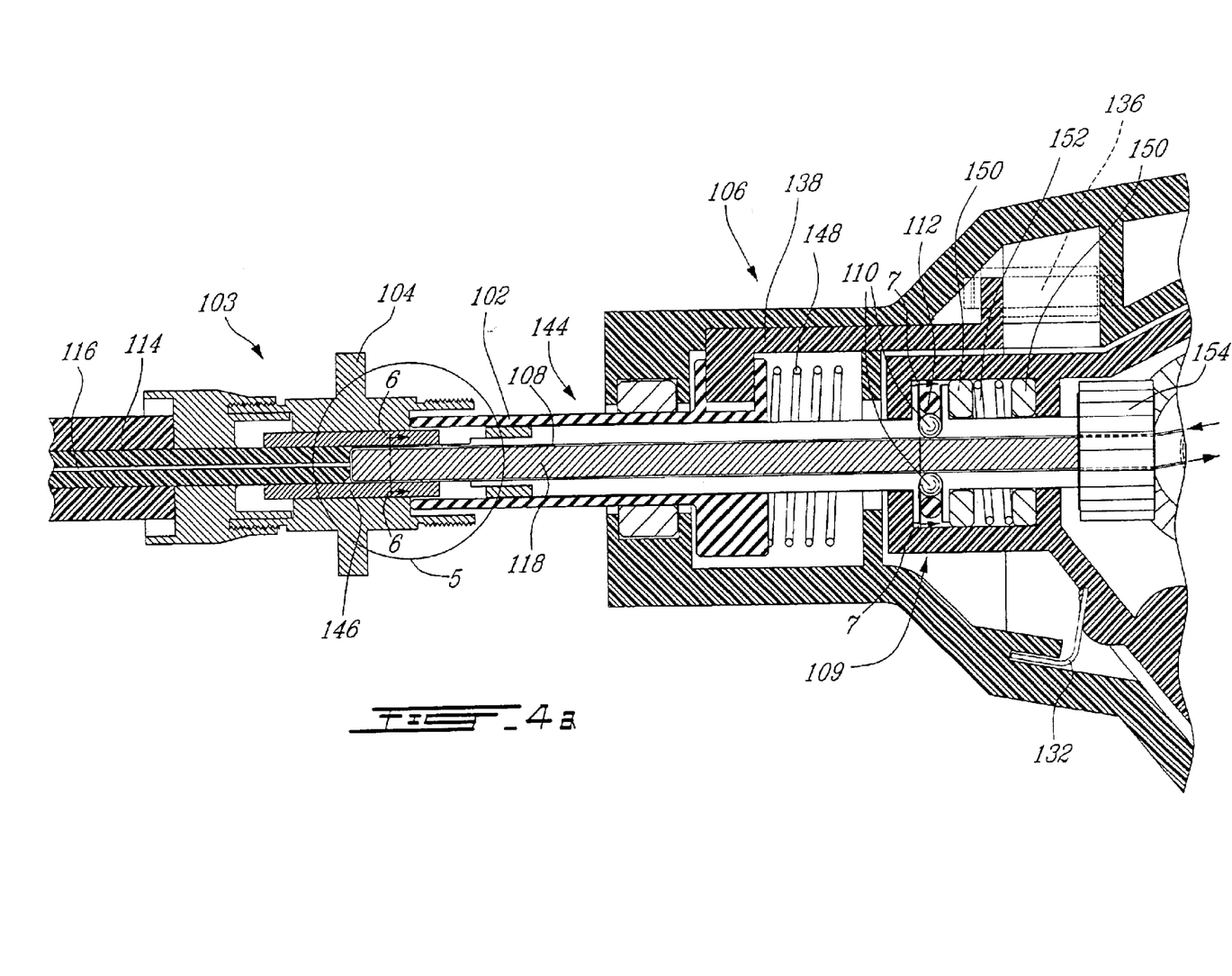
FIG. 4a is a side cross-sectional view of the fabric guider assembly of the cleaning tool assembly mated to a FC optical connector assembly with an adaptor to clean the end face of the ferrule as well the interior of the sleeve of the adaptor.

FIG. 4a demonstrates the applicability of a fabric guider assembly 144 to a connector assembly 103 having an adaptor 104. It should be understood that an interchangeable mating nose 160 could be adapted to any optical connector type assemblies.

When an adaptor 104 is used, the adaptor has a sleeve 146 which secures the ferrule 114 within the connector assembly 103 for proper alignment when connected to another device. This sleeve is typically made of stainless steel or ceramic. It can be removable from the adaptor and is typically about 0.8 mm in width. The sleeve is often slightly spring loaded on the ferrule to ensure stable alignment in the connector.

The interior wall of the sleeve 146 may also become contaminated, just like the ferrule and optical device end faces and is preferably cleaned when the end faces are cleaned.

The mating nose 118 of the fabric guider assembly 144 is made of a soft material to avoid damaging the ferrule 114 and the optical device 116 end surfaces when the cleaning tool is mated to the connector assembly 103 and pressed against the end surfaces. Hard materials could scratch and damage the ferrule 114 and optical fiber 116 end surfaces during the cleaning process, while the mating nose 118 is rotating.

The mating nose 118 is preferably made of Techtron® PolyPhenylene Sulfide (PPS) which has a hardness less than that of the ferrule and/or the optical device. The mating nose is also polished to ensure that the surface to be in contact with the ferrule is smooth and does not have surface defects. The mating nose should also have a flexural modulus greater than 2700 MPa.

Figures 6, 7:
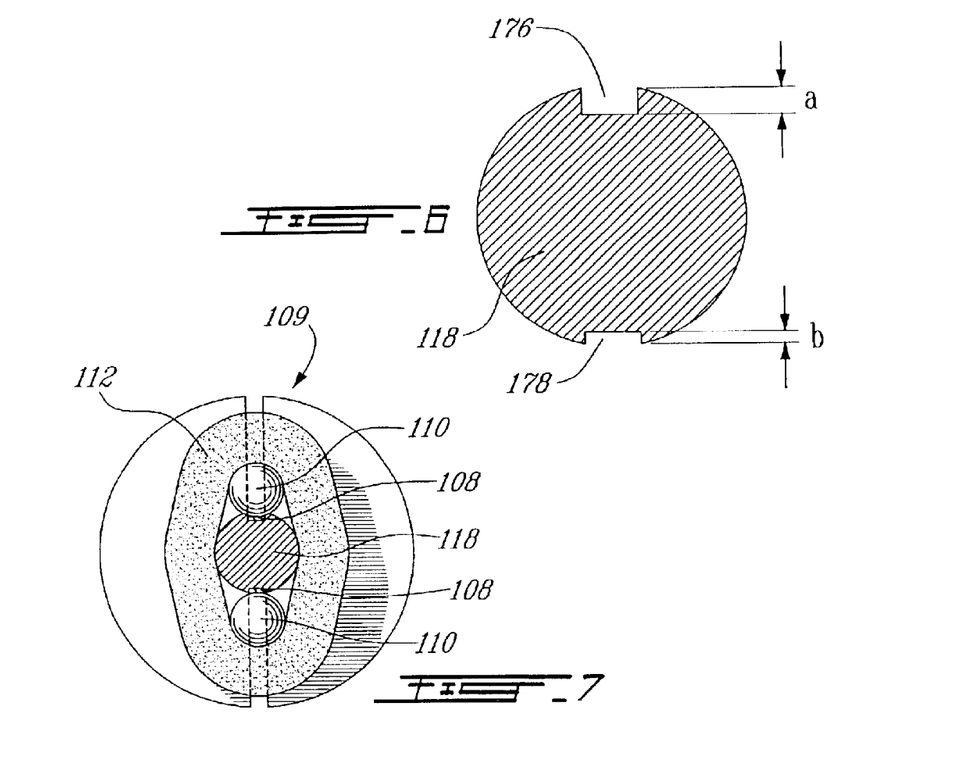

The tool adaptor 102 is specially adapted to mate with connector assembly 103. The cleaning fabric 108 travels on the fabric guider assembly 144 to the mating nose 118. The cleaning fabric 108 is inserted in grooves 176 and 178 as shown in FIG. 6.

Figure 4B:
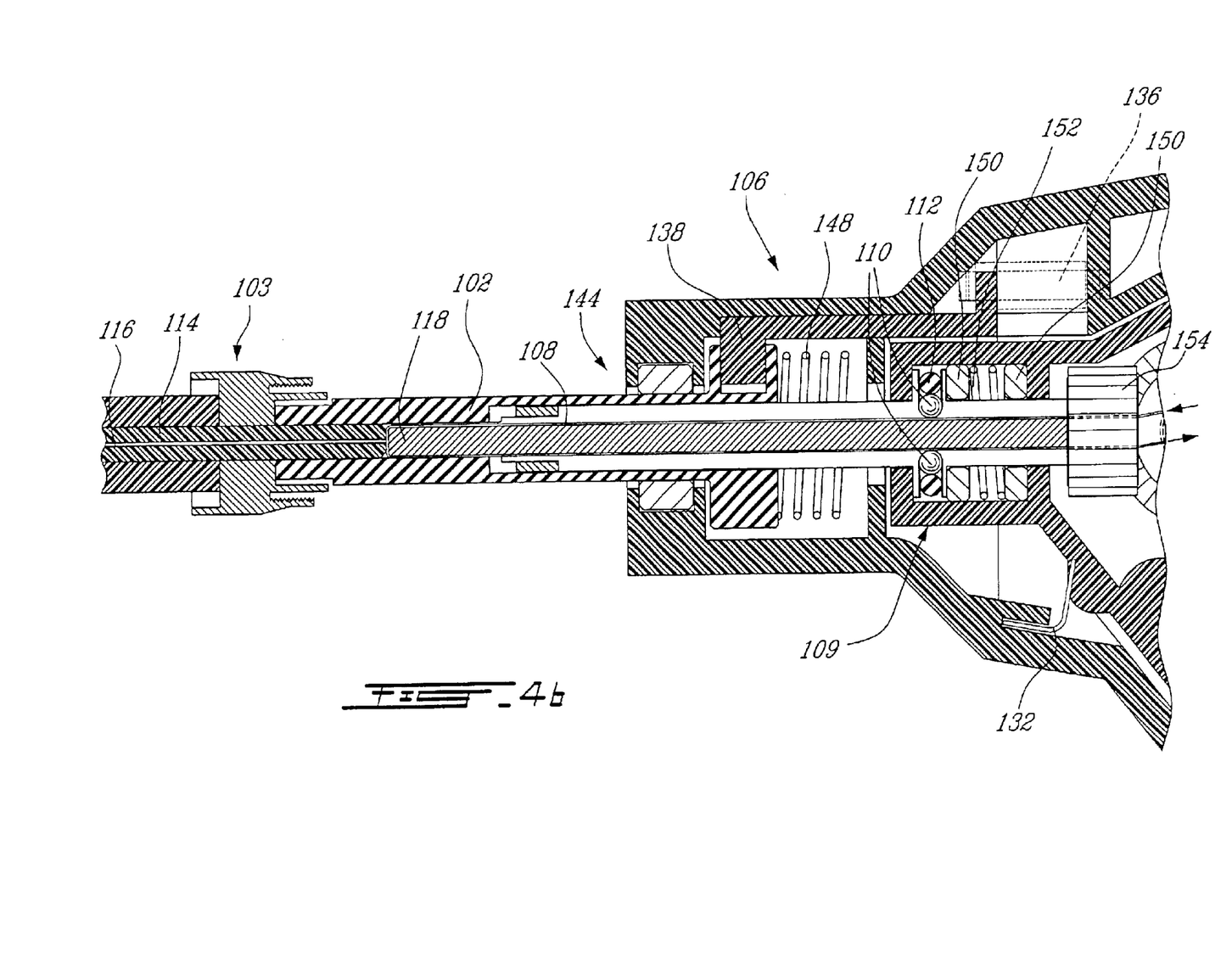
FIG. 4b is a side cross-sectional view of the fabnc guider assembly of the cleaning tool assembly mated to a FC optical connector assembly to clean the end face of the ferrule.

The pressure compensator 106 is shown in more detail on FIG. 4b. The tool adaptor. 102 ends on a spring 148 which compensates for the pressure exerted on the connector assembly 103 by the tool adaptor 102. The switch rod 138 and switch 136 are also shown and react to start the motor once enough pressure is exerted on the tool adaptor 102.

In order for the fabric to be at a proper tension on the fabric guider assembly 144, a tension assembly 109 is provided in the fabric guider assembly 144. Two balls 110, preferably of stainless steel, are placed in a cylindrical cavity surrounding the mating nose 118 and touch the grooves 176 and 178. They are held in place by an O-ring 112 which applied a constant pressure on the balls 110. This prevents the cleaning fabric 108 from exiting the grooves 176 and 178. The material of the balls 110 being harder than that of the cleaning fabric and having a constant smooth shape ensures, a constant pressure on the cleaning fabric. The balls are held in the cylinder which prevents them from escaping the grooves. Referral is made to FIG. 7 for a detail of the tension assembly.

Finally, the washers 150 and spring 152 of the cartridge 122 are shown which allow a second pressure compensation stage for the mating nose.

FIG. 4b shows how the mating nose 118 of the fabric guider assembly 144 of the cleaning device 100 is mated to the optical connector assembly 103. The optical connector assembly 103 is composed of a ferrule 114 in which is precisely held the optical fiber 116 or any other optical device.

Figure 5:
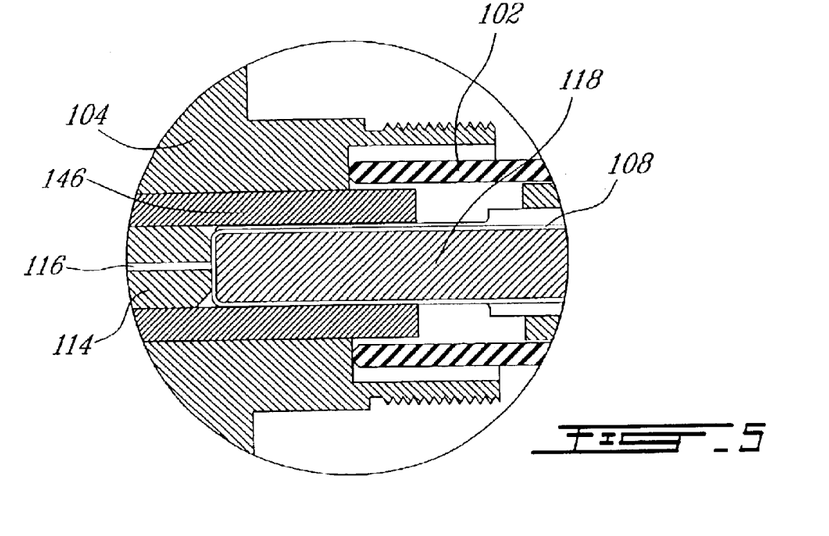

FIG. 5 is a detail of FIG. 4a in which the fabric 108 is clearly shown as traveling within a deeper groove 176 on the way to the ferrule 114 end face and within a shallower groove 178 on the way back to the used or dirty reel. As the mating nose 118 is rotated, the fiber which has been used to clean the ferrule end face is used to clean the interior sleeve 146 of the adaptor 104.

As shown in FIG. 6, the nose 118 has two grooves 176 and 178 which guide the cleaning fabric along the sides of the guider 144. The two grooves 176 and 178 guiding the cleaning fabric are asymmetric in terms of depth. Groove 176 is deeper than groove 178. The grooves' dimension difference allows to avoid the cleaning fabric carrying contaminants before arriving to the ferrule. The portion of the cleaning fabric traveling in the deeper groove 176 does not touch the assembly elements, thereby avoiding to catch contaminant particles such as dust and abrasive materials. Once the portion of the fabric has cleaned the ferrule and the optical device end face, the fabric is pulled towards the cartridge in a shallower groove 178 since contamination of the returning fabric is not important. If there is an adaptor, it then cleans the interior wall of the adaptor. It should be noted that at least one groove should be shallow to ensure cleaning of the interior of the adaptor sleeve as shown in FIG. 5. In the present case, groove 176 has a depth of a and groove 178 has a depth of b. Preferably, depth a is 0.2 mm and depth b is 0.1 mm. The width of the grooves is preferably 0.5 mm.

Alternatively, the mating nose 118 could have a shallow groove 178 and a tube (not shown) within the whole length of the mating nose for circulating the clean fabric. This would replace the deep groove 176 and the tension assembly 109 would need to be modified accordingly. One of the balls would be removed and a smaller diameter O-ring would be used. One will understand that the exit of the tube at the mating nose end would need to be on the perimeter of the end face of the mating nose to allow a rotation of 180 degrees to clean the whole ferrule end face.

Alternatively, the grooves 176, 178 could be located closer on the fabric guider assembly 144 as long as they are diametrically opposed at the end face of the mating nose to allow a rotation of 180 degrees to clean the whole ferrule end face.

FIG. 7 is a detail of the tension assembly 109. O-ring 112 surrounds two balls 110 positioned on the grooves 176 and 178 of the fabric guider 144. The fabric 108 is trapped between the ball 110 and the bottom wall of the groove. As the fabric is circulated, the balls rotate and exert a constant tension on the fabric, keeping it at an appropriate tension.

In operation, the following steps are undertaken. A type of optical connector assembly 103 containing the ferrule to be cleaned is determined. The cleaning tool assembly 100 is chosen and handled by a technician. It has a tool adaptor 102 of the appropriate type. A replaceable cartridge assembly 122 is introduced into the cleaning tool 100 and snapped in place. The cartridge assembly 122 contains enough clean fabric to clean at least one ferrule. The tool adaptor 102 is slowly pushed against the optical connector assembly 103 to contact it. Once a contact is made between the tool adaptor and the connector, the cleaning tool is further pushed towards the connector to make the nose contact the ferrule end face.

Then, depending on the type of tool adaptor chosen, the cleaning tool can either clean only the end face of the ferrule (see FIG. 4b) or the end face as well as the interior wall of the sleeve of the adaptor (see FIG. 4a). If the cleaning tool only cleans the end face, the motor is activated when the nose contacts the ferrule end face. It is activated by the switch rod 138 which activates the switch 136. The cleaning fabric is pulled from the clean reel traction gear 168 to the dirty reel traction gear 166 through the fabric guider assembly 144. The motor also activates the lever 160 which ensures that the fabric guider assembler head rotates at least 180° to ensure that the fabric band covers the whole end face surface of the ferrule.

If the cleaning tool cleans the end face as well as the interior sleeve of the adaptor, the cleaning tool is further pushed to insert the mating nose towards the ferrule. When the end face of the ferrule contacts the nose, the motor is activated by the switch rod 138 which activates the switch 136 and the fiber is pulled from the clean reel traction gear 168 to the dirty reel traction gear 166 through the fabric guider assembly 144. The motor also activates the lever 160 which ensures that the fabric guider assembler head rotates at least 180° to ensure that the fiber band covers the whole end face surface of the ferrule as well as the interior sleeve of the adaptor.

Preferred dimensions and materials for the components of the invention are as follows: the mating nose has a preferred diameter of 2.4 mm. The cleaning fabric has a width of 0.5 mm and a thickness of 0.15 mm. There is about 72 meters of cleaning fabrics on the reel traction gears. The cleaning fabric can be made of a plurality of materials but polyester has been found to work well. The cleaning tool is activated for about 4 to 5 seconds to clean each ferrule end face. The rotation speed of the mating nose is about 50° per second.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set scope forth, and as follows in the scope of the appended claims.

What is claimed is:

1. A device for cleaning at least an end face of an optical device retained within an optical connector using a cleaning fabric, comprising:
   a housing having a handle portion, a supply for said cleaning fabric and a forward tip, the forward tip being adapted to mate with said optical connector;
   a cleaning nose within said forward tip adapted to receive said cleaning fabric and to be at least partially inserted in said optical connector to contact at least the end face of the optical device;
   circulation means for circulating the cleaning fabric within said housing and on said cleaning nose to expose an unused portion of cleaning fabric on an extremity of said cleaning nose contacting said end face;
   said cleaning nose having a supply channel and a take-up groove located diametrically opposed on said extremity of said nose, said channel and said groove being adapted to respectively receive a supply of said fabric and a contaminated portion of said fabric, said fabric being contaminated on contact with said end face on said extremity;
   said supply channel preventing said fabric from contacting said optical connector prior to contacting said end face of the optical device.

2. A device as claimed in claim 1, further comprising rotation means for rotating said cleaning nose by at least 180° to wipe said cleaning fabric over a whole surface of the end face.

3. A device as claimed in claim 1, wherein an end face of said cleaning nose is circular.

4. A device as claimed in claim 1, wherein said supply channel is a supply groove having a depth greater than a thickness of said cleaning fabric.

5. A device as claimed in claim 1, wherein said circulation means are powered by a motor.

6. A device as claimed in claim 1, wherein said optical device is an optical fiber.

7. A device as claimed in claim 1, wherein said optical connector comprises a ferrule.

8. A device as claimed in claim 4, wherein said supply groove has a depth of 0.2 mm and said take-up groove has a depth of 0.1 mm.

9. A device as claimed in claim 1, wherein said connector comprises an adaptor with an adaptor sleeve and said adaptor sleeve is cleaned as said fabric is circulated by said circulation means.

10. A device as claimed in claim 1, wherein said supply channel is a tube within said cleaning nose.

11. A device as claimed in claim 1, further comprising a tension assembly having two transverse walls, a ball partially received in said take-up groove and a gasket surrounding said nose and said ball, wherein said gasket and ball are trapped between said walls, whereby as said fabric is circulated, said balls are rotated and exert a constant pressure on said fabric thereby ensuring a constant tension on the fabric.

12. A device as claimed in claim 11, wherein said gasket is an o-ring.

13. A device as claimed in claim 11, wherein said balls are made of stainless steel.

14. A device as claimed in claim 11, wherein said supply channel is a supply groove and said tension assembly has a second ball partially received in said supply groove and surrounded by said gasket.

15. A device as claimed in claim 1, wherein a take-up reel is mounted in the housing to take-up the fabric from the take-up groove after cleaning.

16. A device for cleaning at least an end face of an optical device retained within an optical connector using a cleaning fabric, comprising:
   a housing having a handle portion, a supply for said cleaning fabric and a forward tip, the forward tip being adapted to mate with said optical connector;
   a cleaning nose mounted within said forward tip adapted to receive said cleaning fabric and to be at least partially inserted in said optical connector to contact at least the end face of the optical device;
   rotation means for rotating said cleaning nose by at least 180° to wipe said cleaning fabric over a whole surface of the end face;
   wherein said cleaning nose is made of a nose material having a hardness less than that of a material of said optical device with a flexural modulus greater than 2700 MPa and wherein an extremity of said nose is polished to prevent damage to said end face when pressure is applied on said housing towards said connector.

17. A device as claimed in claim 16, wherein said optical device material is stainless steel and said nose material is polyphenylene sulfide.

18. A device for cleaning at least an end face of an optical device retained within an optical connector using a cleaning fabric, comprising:
   a housing having a handle portion, a supply for said cleaning fabric and a forward tip, the forward tip being adapted to mate with said optical connector;
   a cleaning nose within said forward tip adapted to receive said cleaning fabric and to be at least partially inserted in said optical connector to contact at least the end face of the optical device;
   circulation means for circulating the cleaning fabric within said housing and on said cleaning nose to expose an unused portion of cleaning fabric on an extremity of said cleaning nose contacting said end face;
   said cleaning nose having a supply groove and a take-up groove located along said nose, said supply and take-up grooves being adapted to respectively receive a supply of said fabric and a contaminated portion of said fabric, said fabric being contaminated on contact with at least said end face;
   a tension assembly having two transverse walls, two balls each partially received in one of said grooves and a gasket surrounding said nose and said balls, wherein said gasket and balls are trapped between said walls;
   whereby as said fabric is circulated, said balls are rotated and exert a constant pressure on said fabric thereby ensuring a constant tension on the fabric.

19. A device as claimed in claim 18, wherein said gasket is an o-ring.

20. A device as claimed in claim 18, wherein said balls are made of stainless steel.

21. A method for cleaning at least an end face of an optical device retained within an optical connector using a cleaning fabric, comprising:

providing a housing having a handle portion, a supply for said cleaning fabric and a forward tip, the forward tip being adapted to mate with said optical connector;

receiving said cleaning fabric at a cleaning nose within said forward tip;

partially inserting said cleaning nose in said optical connector to contact at least the end face of the optical device;

circulating the cleaning fabric within said housing and on said cleaning nose to expose an unused portion of cleaning fabric on an extremity of said cleaning nose contacting said end face;

preventing said cleaning fabric from contacting said connector prior to contacting said end face of the optical device.

22. A method as claimed in claim 21, further comprising rotating said cleaning nose by at least 180° to wipe said cleaning fabric over a whole surface of the end face.

23. A method as claimed in claim 21, wherein said preventing comprises providing a supply groove on said nose having a depth greater than a thickness of said cleaning fabric.

24. A method as claimed in claim 21, wherein said preventing comprises providing a supply channel within said nose for said fabric.

25. A method as claimed in claim 21, wherein said optical device is an optical fiber.

26. A method as claimed in claim 21, wherein said optical connector comprises a ferrule.

27. A method as claimed in claim 21, wherein said connector comprises an adaptor with an adaptor sleeve and further comprising cleaning said adaptor sleeve as said fabric is circulated.

28. A method as claimed in claim 21, further comprising ensuring a constant tension on the fabric as it is circulated.

29. A method as claimed in claim 21, further comprising accumulating said contaminated fabric on a take-up reel mounted in the housing.

30. A method for cleaning at least an end face of an optical device retained within an optical connector using a cleaning fabric, comprising:

providing a housing having a handle portion, a supply for said cleaning fabric and a forward tip, the forward tip being adapted to mate with said optical connector;

providing a cleaning nose within said forward tip for receiving said cleaning fabric, said cleaning nose being made of a nose material having a hardness less than that of a material of said optical device with a flexural modulus greater than 2700 MPa and wherein an extremity of said nose is polished to prevent damage to said end face when pressure is applied on said housing towards said connector;

partially inserting said cleaning nose in said optical connector to contact at least the end face of the optical device;

rotating said cleaning nose by at least 180° to wipe said cleaning fabric over a whole surface of the end face.

31. A method as claimed in claim 30, wherein said optical device material is stainless steel and said nose material is polyphenylene sulfide.

32. A method for cleaning at least an end face of an optical device retained within an optical connector using a cleaning fabric, comprising:

providing a housing having a handle portion, a supply for said cleaning fabric and a forward tip, the forward tip being adapted to mate with said optical connector;

providing a cleaning nose having a supply groove and a take-up groove located along said nose, said supply and take-up grooves being adapted to respectively receive a supply of said fabric and a contaminated portion of said fabric, said fabric being contaminated on contact with at least said end face;

inserting said cleaning nose in said optical connector to contact at least the end face of the optical device;

circulating the cleaning fabric within said housing and on said cleaning nose to expose an unused portion of cleaning fabric on an extremity of said cleaning nose contacting said end face;

ensuring a constant tension on the fabric as it is circulated.

33. A method as claimed in claim 32, wherein said ensuring comprises providing a tension assembly having two transverse walls, two balls each partially received in one of said grooves and a gasket surrounding said nose and said balls, wherein said gasket and balls are trapped between said walls.

* * * * *